Patented July 7, 1931

1,813,236

UNITED STATES PATENT OFFICE

LOUIS K. FACKLER, OF RIDGEWOOD, NEW JERSEY, AND HERBERT F. GARDNER, OF BROOKLYN, NEW YORK, ASSIGNORS TO STEIN, HALL & COMPANY, INC., A CORPORATION OF NEW YORK

ADHESIVE COMPOSITION AND METHOD OF MAKING THE SAME

No Drawing. Application filed December 9, 1927. Serial No. 238,992.

Our invention relates to a new adhesive composition and the process of making the same, and more particularly to the manufacture of adhesives from starch or starchy carbohydrates.

It has long been known that various adhesives, such as liquid paste, mucilage and glue, could be prepared from starch or starchy carbohydrate materials by bringing about partial conversion or degeneration of the starch to carbohydrate compounds of different molecular weight and dissolving or suspending the product in greater or lesser amounts of water depending upon the use to which the adhesive is to be put. It it also known that the proportion of water which is required to be incorporated with starch to form a smooth colloidal solution or suspension of a given viscosity varies depending on the source from which the starch is derived and its subsequent treatment. Various methods have been proposed for treating starch to increase its colloidal solubility so that when mixed with relatively small amounts of water it would possess the fluidity, viscosity and adhesive properties desired in a strong glue, such as those used in gluing wood, leather and similar materials together. Such methods, may, for example, contemplate a preliminary starch conversion treatment, such for example, as an acid treatment, followed by a treatment with an agent, for example, a solution of caustic alkali, tending to dissolve not only the beta starch or granulose but also the more difficultly soluble alpha starch or starch cellulose constituent of the starch granules and thereby to impart the desired viscosity to the resulting product. The presence of alkali in adhesive compositions may preclude their use in gluing woods, particularly those of the finer and more expensive sorts, such as mahogany, etc., because of the tendency of the alkali to attack the lignins and similar constituents of the wood, causing discoloration and other deleterious effects.

According to our invention the conversion of the starch or starchy carbohydrate material into an adhesive possessing highly desirable properties as respects viscosity, fluidity and other properties requisite for a high-grade glue is brought about in one step and without the use of an alkali. The invention comprises a process of treating starch or a starchy material with an aromatic compound containing one or more carboxyl, sulphonic or other acidic groups, or anhydrides or salts thereof, to produce an adhesive characterized by its ability to form with a relatively small proportion of water a smooth colloidal solution or suspension and capable, when mixed with water in the desired proportions, of use as a glue for uniting wood, leather or the like, or as a size, paste or other adhesive, depending upon the amount of water incorporated therewith. The invention also comprises the new product of such process.

In carrying out my invention, the starch or starch-containing material and the aromatic compound are mixed, preferably in the dry state and then heated with water to approximately 90–95° C., i. e., 10 to 20 degrees above the bursting point of the starch granules. The heating is continued until a clear liquid is obtained and until a sample flows smoothly and freely when cold. While various starches or starch-containing materials may be used, I prefer to use an ordinary commercial tapioca flour. Aromatic compounds of the class above specified appear to bring about the conversion of the starch catalytically, since they appear to be unchanged in the resulting mixture. It is also to be noted that, while the starch cellulose envelopes of the starch granules are ruptured by the heat treatment and apparently completely disintegrated or dissolved while the mixture is hot, when it is cooled down to normal temperatures such starch cellulose particles, or at least a substantial portion of them, precipitate or separate out, as is evidenced by the fact that the adhesive composition when cold is substantially white and opaque whereas while still hot at the time of the completion of the heat treatment it appears clear and transparent. Among the aromatic compounds of the class above described which have been used are salicylic acid and salts thereof, sulphanilic acid, naphthol sulphonic acid, naphthylamine sulphonic acid and phthalic anhydride.

A very satisfactory adhesive paste for use in the manufacture of paper bags and for similar purposes may be prepared by forming a mixture of 100 parts of a good commercial grade of tapioca flour, 500 parts water and 1 part phthalic anhydride, all by weight, and rapidly heating to bring the temperature up to approximately 90° C. and keeping it at that point for about one-half hour. The resulting product is very fluid when hot and on cooling forms a soft paste.

A glue for use in joining wood and similar materials may be prepared by forming a mixture of 100 parts tapioca flour, 200 to 300 parts of water and one part of phthalic anhydride, all by weight, and bringing the temperature of the mixture up to 90° C. and maintaining it at about that temperature for approximately one-half hour. The resulting product flows freely when cold and is characterized by the viscosity, tackiness and inherent properties which are considered essential in the best grades of glues, both animal and vegetable, used in furniture manufacture and for similar purposes. Owing to the relatively small amount of water required to produce a glue of satisfactory flowing properties, the glue sets quickly and the drying of the same is not attended by warping of the wood members being united. The glue when used in uniting wood members forms a closely adhering film over the wood surfaces without pronounced penetration, in this respect behaving in substantially the same manner as the better grades of animal glue and not as the alkali-containing vegetable glues, which, due to the alkali present, penetrate the wood to a substantial depth and lead to discoloration of the same. The strength of the joint formed by the use of such glue is, however, comparable to that of the best glues available.

In addition to the above, the following examples are given to illustrate the use of some of the other aromatic compounds above mentioned:

Sulphanilic acid

A mixture of 100 parts tapioca flour, 250 parts of water, and ¾ part of sulphanilic acid, all by weight, is heated to 90° C. and kept at about this temperature until a sample upon being cooled runs smoothly and freely. A very satisfactory adhesive for gluing wood and the like is obtained.

Naphthylamine sulphonic acid

A composition containing 100 parts tapioca flour, 225 parts of water, and 1 part of naphthylamine sulphonic acid, all by weight, when treated as described in the preceding paragraph, will likewise form a very satisfactory wood glue.

In the preparation of adhesives according to the present invention it is desirable to stir the mixture thoroughly during the heating step.

It will be understood that the proportion of the aromatic compound may be varied considerably from the proportions set forth in the specific examples above given, good results being obtained with the use of phthalic anhydride when the same is present in the proportion of from 0.2% to 5% by weight of the starch or starch-containing material used. The other aromatic compounds mentioned may be varied over a similar range. It will be understood that when a large proportion is used the conversion of the starch tends to be accelerated when other conditions are the same, and vice versa when a smaller proportion is used. In some instances, as where the aromatic compound used has a characteristic color which it is desired not to impart to any substantial extent to the resulting glue composition, it may be desirable to keep the proportion of such compound low, even though the time required for effecting the conversion of the starch is prolonged. The presence of natural impurities in the starch material used, such for example as the fibrous outer skin portions of the manioc root, may also make it necessary to increase the amount of the conversion agent. The ordinary tests employed by those skilled in the art may be used in determining when the conversion of the starch has been carried to the point desired. In general this point will have been indicated when after cooking the batch for such time that a clear and smooth liquid is formed, a sample on being cooled flows freely and does not solidify into a rubbery and jellified mass. When the cooking is carried on as above described, no substantial amount of the starch is converted into dextrin. While the invention has been described with particular reference to the use of the composition in furniture manufacture and in the manufacture of paper bags and the like it will be understood that it is capable of many other applications and that the proportions of the starch and water may be varied over a considerable range depending upon the purpose for which the adhesive is to be used. It is also to be understood that other starches and starchy materials than tapioca starch or flour may be used. Among others which may be mentioned are corn starch, potato starch, and cereal flours such as those made from corn, wheat, rice, etc.

Various modifications in the procedure outlined may also be made and will suggest themselves to those skilled in the art, without departing from the scope of the invention which is not to be deemed as limited other than as indicated in the appended claims.

What we claim is:

1. Process of making adhesives which comprises suspending in water a mixture of a starchy carbohydrate and an aromatic compound containing one or more of the groups consisting of carboxyl, sulphonic acid and acid anhydride, and subjecting the aqueous suspension to heat for such time and at such a temperature as to cause rupture of the starch cellulose envelopes of the starch granules and to produce an adhesive adapted for gluing wood and the like and having free-flowing properties when cold.

2. Process of making adhesives which comprises suspending a mixture of starchy carbohydrate and an aromatic compound containing one or more acid anhydride groups in water and subjecting the aqueous suspension to heat for such time and at such a temperature as to cause rupture of the starch cellulose envelopes of the starch granules and to produce an adhesive adapted for gluing wood and the like and having free-flowing properties when cold.

3. Process of making adhesives which comprises suspending a mixture of a starchy carbohydrate and phthalic anhydride in water and subjecting the aqueous suspension to heat for such time and at such a temperature as to cause rupture of the starch cellulose envelopes of the starch granules and to produce an adhesive adapted for gluing wood and the like and having free-flowing properties when cold.

4. A composition for use in making adhesives which comprises starch and an aromatic compound containing one or more acid anhydride groups.

5. A composition for use in making adhesives which comprises starch and phthalic anhydride.

6. A composition for use in making adhesives which comprises starch and from 0.2% to 5% phthalic anhydride.

7. A non-alkaline adhesive composition comprising principally starch-conversion products and water, and minor amounts of an aromatic compound containing one or more of the groups consisting of carboxyl, sulphonic acid and acid anhydride.

8. A non-alkaline adhesive composition comprising principally starch-conversion products and water, and minor amounts of an aromatic compound comprising one or more acid anhydride groups.

9. A non-alkaline adhesive composition comprising principally starch-conversion products and water, and minor amounts of phthalic anhydride.

10. A non-alkaline vegetable glue for gluing wood and the like comprising starch-conversion products and water in the proportion of about 200 to 300 parts of water to 100 parts of the starch-conversion products, and from 0.2 to 5 parts of an aromatic compound containing one or more of the groups consisting of carboxyl, sulphonic acid and acid anhydride.

11. A composition for use in making adhesives which comprises starch and an aromatic compound containing at least one radical selected from the group consisting of carboxyl, sulphonic acid and acid anhydride.

In testimony whereof, we have signed our names to this specification.

LOUIS K. FACKLER.
HERBERT F. GARDNER.